United States Patent [19]

Schwanke

[11] Patent Number: 5,317,741
[45] Date of Patent: May 31, 1994

[54] COMPUTER METHOD FOR IDENTIFYING A MISCLASSIFIED SOFTWARE OBJECT IN A CLUSTER OF INTERNALLY SIMILAR SOFTWARE OBJECTS

[75] Inventor: Robert W. Schwanke, North Brunswick, N.J.

[73] Assignee: Siemens Corporate Research, Inc., Princeton, N.J.

[21] Appl. No.: 698,635

[22] Filed: May 10, 1991

[51] Int. Cl.$^5$ .................. G06F 9/44; G06F 15/40
[52] U.S. Cl. .................. 395/700; 364/DIG. 2; 364/96.3; 364/962; 364/973; 395/600
[58] Field of Search .................. 395/700, 650, 200

[56] References Cited

U.S. PATENT DOCUMENTS

| 4,319,221 | 3/1982 | Sakoe | 340/146.3 |
|---|---|---|---|
| 4,326,101 | 4/1982 | Sakoe | 179/1 SD |
| 4,467,437 | 8/1984 | Tsuruta et al. | 364/513.5 |
| 4,484,348 | 11/1984 | Shizuno | 382/48 |
| 4,528,688 | 7/1985 | Ichikawa et al. | 381/43 |
| 4,530,110 | 7/1985 | Nojiri et al. | 381/43 |
| 4,559,604 | 12/1985 | Ichikawa et al. | 364/513.5 |
| 4,624,011 | 11/1986 | Watanabe et al. | 381/43 |
| 4,651,289 | 3/1987 | Maeda et al. | 364/513.5 |
| 4,716,593 | 12/1987 | Hirai et al. | 381/42 |
| 4,723,290 | 2/1988 | Watanabe et al. | 381/43 |
| 4,731,845 | 3/1988 | Matsuki et al. | 381/43 |
| 4,745,562 | 5/1988 | Frazdny | 364/551 |
| 4,752,957 | 6/1988 | Maeda | 381/42 |
| 4,773,099 | 9/1988 | Bokser | 382/14 |
| 4,783,806 | 11/1988 | Nakamura et al. | 381/43 |
| 4,876,731 | 10/1989 | Loris et al. | 382/40 |
| 4,893,255 | 1/1990 | Tomlinson, Jr. | 364/513 |
| 4,897,811 | 1/1990 | Scofield | 364/900 |

FOREIGN PATENT DOCUMENTS 0245508 11/1987 European Pat. Off. .
8703399 6/1987 PCT Int'l Appl. .
8810476 12/1988 PCT Int'l Appl. .

OTHER PUBLICATIONS

"Empirically Guided Software Development Using Metric-Based Classification Trees", Porter et al., IEEE Software, Mar. 1990, pp. 46-54.

"Change Management for Very Large Software Systems", Maarek et al., Seventh Ann. Int'l Phoenix Conf. on Computers & Comm., Scottsdale, Ariz., Mar. 1988, pp. 280-285.

"Information Distribution Aspects of Design Methodology", Parnas, Information Processing 71, North-Holland Publishing Company (1972), pp. 339-344.

Paper entitled "On the Criteria To Be Used In Decomposing Systems Into Modules", by Parnas.

Ada 9X Program Structure and Compilation Issues, Draft Mapping Document, 21 Feb. 1991, pp. 10-1-1-0-5.

"Software Change Dynamics or Half of all Ada Compilations are Redundant", Adams et al., Univ. of Karlsruhe, Karlsruhe, FRG, Jun. 8, 1989, pp. 1-15.

"System Structure Analysis: Clustering with Data Bindings", Hutchens et al., IEEE Transactions on Software Eng., vol. SE-11, No. 8, Aug. 1985, pp. 749-757.

"System Partitioning and Its Measure", Belady et al., The Journal of Systems & Software 2, 23-29 (1981), Elsevier North Holland, Inc., 1981, pp. 23-29.

"Features of Similarity", Tversky, Psychological Review, vol. 84, No. 4, Jul. 1977, pp. 327-351.

(List continued on next page.)

Primary Examiner—Kevin A. Kriess
Attorney, Agent, or Firm—Adel A. Ahmed

[57] ABSTRACT

A method for identifying software objects that have been assigned to a wrong group, in which the similarity between objects is known, such as by evaluating a similarity function, comprises the steps of checking each object to see whether it belongs to its current group with K peers and confidence N, checking whether each object belongs to another group with a lower and therefore better confidence rating, and identifying as misclassified those objects having a lower confidence rating in said another group.

5 Claims, No Drawings

OTHER PUBLICATIONS

"A Parallel Network that Learns to Play Backgammon", Tesauro et al., Artificial Intelligence 39 (1989), pp. 357–390.

"Modularization and Hierarchy in a Family of Operating Systems", Habermann et al., Communications of the ACM, May 1976, vol. 19, No. 5, pp. 266–272.

"Version Management in Gypsy", Proceedings of the ACM SIGSOFT/SIGPLAN . . . , Boston, Mass., Nov. 28–30, 1988, pp. 201–215.

"Error Localization During Software Maintenance: Generating Hierarchical System Descriptions from the Source Code Alone", Selby et al., Conference on Software Maintenance–1988, Phoenix, Ariz., Oct. 24–27, 1988, pp. 192–197.

"Extracting and Restructuring the Design of Large Systems", Choi et al., IEEE Software, Jan. 1990, pp. 66–71.

Article entitled "Tools for Software Configuration Management" by Tichy.

"Configuration Management, The Notion and the Tools", Estublier, Proceedings of the International Workshop on Software Version and Configuration Control, Jan. 27–29, 1988 Grassau, pp. 38–61.

"Program–Variations–in–the–Small", Winkler et al., Proceedings of the International Workshop on Software Version and Configuration Control, Jan. 27–29, 1988 Grassau, pp. 175–196.

"Learning Internal Representations by Error Propagation", Rumelhart, pp. 318–362.

"A Taxonomy of Some Principal Types of Data and of Multidimensional Methods for Their Analysis", Shepard, pp. 21–47.

"Programming–in–the–Large Versus Programming–in–the–Small", DeRemer et al., IEEE Transactions on Software Engineering, vol. SE-2, No. 2, Jun. 1976, pp. 80–86.

"The C Information Abstraction System", Chen et al., IEEE Transactions on Software Engineering, vol. 16, No. 3, Mar. 1990, pp. 325–334.

"Configuration Management in BiiN TM SMS", Schwanke et al.

"A Method for Improving the Classification Speed of Clustering Algorithms Which Use a Euclidean Distance Metric", Curle et al., Proceedings of the IEEE, vol. 69, No. 1, Jan. 1981, pp. 128–129.

COMPUTER METHOD FOR IDENTIFYING A MISCLASSIFIED SOFTWARE OBJECT IN A CLUSTER OF INTERNALLY SIMILAR SOFTWARE OBJECTS

The following related patent applications are being filed on even date herewith in the name of the present inventor. The disclosed subject matter thereof is herein incorporated by reference. The application entitled A FEATURE RATIO METHOD FOR COMPUTING SOFTWARE SIMILARITY discloses a method for computing the similarity between first and second software objects. The application entitled AN INTERACTIVE METHOD OF USING A GROUP SIMILARITY MEASURE FOR PROVIDING A DECISION ON WHICH GROUPS TO COMBINE discloses a method of using a group similarity measure, with an analyst, on a set containing a plurality of groups, the groups containing software objects, for providing a decision on which groups to combine. The application entitled A METHOD FOR COMPUTING THE SIMILARITY BETWEEN TWO GROUPS OF OBJECTS discloses a method for computing the similarity between two groups of objects wherein the similarity between any pair of objects can be computed by a similarity function, the method being for use in software clustering. The application entitled A TWO-NEIGHBORHOOD METHOD FOR COMPUTING THE SIMILARITY BETWEEN TWO GROUPS OF OBJECTS discloses another method for computing the similarity between two groups of objects wherein the similarity between any pair of objects can be computed by a similarity function, the method being for use in software clustering. The application entitled A METHOD FOR ADAPTING A SIMILARITY FUNCTION FOR IDENTIFYING MISCLASSIFIED SOFTWARE OBJECTS discloses a method for providing initial estimates for the weights and coefficients of a similarity function, using them to identify an initial maverick list, removing the mavericks from their assigned groups, and then outputting the modified groups, using only qualified data for tuning the similarity function. The application entitled METHOD FOR MODELLING SIMILARITY FUNCTION USING NEURAL NETWORK discloses a method for evaluating the classification of objects into categories. The application entitled METHOD FOR ESTIMATING SIMILARITY FUNCTION COEFFICIENTS FROM OBJECT CLASSIFICATION DATA discloses a method for evaluating the classification of objects into categories, and particularly, to one for estimating coefficients for a similarity function usable for classification. The following related application, Ser. No. 07/525,376 of Schwanke et al., entitled METHOD FOR SOFTWARE STRUCTURE ANALYSIS USING CONCEPTUAL CLUSTERING, filed on May 17, 1990, and herein incorporated by reference, discloses a method directed to the recovery of information relating to the software design of a computer program by studying the code and more specifically, to the recovery of the composition structure of a large program.

1. INTRODUCTION

A medium or large scale software project's success depends heavily on how well the software is organized, because the organization affects understandability, modifiability, integratability, and testability. Unfortunately, because software changes rapidly, even during maintenance, its organization often deteriorates. Each time that a programmer adds a new procedure to the system, he must decide which existing module he should place it in. Sometimes, he should form a new module, containing this object and objects drawn from existing modules, but the mental and administrative effort involved often deters him. Either way, the programmer often has only a worm's eye view of the system, from the corner where he is working, and makes his organizational decisions accordingly.

This problem is exacerbated by the fact that most widely-used programming languages still have inadequate scope-control facilities, so that modularity is a matter of programmer self-discipline, and is not normally enforced by the language support tools.

Sooner or later, someone on the project usually notices that the organization has deteriorated. Typically, a small team of experts is then appointed as "architects", to analyze and reorganize the system. However, their task is even more formidable than the programmer's, because they must understand many more system-wide interrelationships, and must carry out widespread changes without causing the system to break. Furthermore, because the programming language and tools do not support modularity adequately, they must analyze actual cross-reference information to deduce the scopes of many program units, rather than relying on specifications.

A goal of the present invention is to help rescue the architects from their predicament, by providing them with intelligent tools for analyzing the system's structure, reorganizing it, documenting the new structure, and monitoring compliance with it, so that significant structural changes can be detected and evaluated early, before they become irreversible. An aspect of the present invention relates to a graphical and textual "structure chart editor" for maintaining large software systems, hereinafter referred to as "Arch". Arch extracts cross reference data from the code itself and, using the current subsystem tree as a guide, creates several kinds of graphical and textual views of the cross reference data, at varying levels of detail. In order to help create subsystem trees where none existed before, Arch provides a clustering algorithm that groups related procedures and other software objects into modules. In order to improve the quality of existing modules, Arch provides a "critic", which identifies individual software objects that apparently violate good information hiding principles.

L. A. Belady and C. J. Evangelisti, System Partitioning and its Measure. Journal of Systems and Software, 2(2), February 1982. made an early attempt to use data bindings for clustering procedures into modules, but only considered shared global variables. Hutchens, David H., and Victor R. Basili, System Structure Analysis: Clustering with Data Bindings, in IEEE Transactions on Software Engineering, August, 1985, defined several types of data bindings to construct dissimilarity measures. They believed that data flow dependencies were the most precise measure of affinity, but used shared static variables as an approximation that was easy to compute. They also considered that the functions implementing an abstract data type do not necessarily share any variables, but have data-flow links via their callers. They do not disclose counting shared type names or follow this line of investigation.

Yih-Farn Chen, Michael Nishimoto, and C. V. Ramamoorthy, The C Information Abstraction System, IEEE Transactions on Software Engineering, March, 1990, began measuring affinity using shared identifiers concurrently with and independently from the present inventor's work. Robert W. Schwanke and Michael A. Platoff, Cross References are Features. Proc. 2nd International Workshop on Software Configuration Management, published as Software Engineering Notices, Nov. 1989. Chen et al.'s paper stopped at the point of counting shared identifiers, and did not consider distinctive (unshared) identifiers. They also noted that weighting some identifiers more heavily than others was an interesting topic for future research.

Other work in the background area of the present invention is found in the following. Rolf Adams, Annette Weinert and Walter Tichy, Software Engineering Dynamics or Half of all Ada Compilations are Redundant. European Software Engineering Conference, 1989. Ellis S. Cohen, Dilip Soni et al., Version Management in Gypsy. Proc. Third ACM Symposium on Practical Software Development Environments, published as Software Engineering Notes,13(5), November 1988, and Sigplan Notices, 24(2), February 1989. Frank DeRemer and Hans H. Kron, Programming-in-the-Large vs. Programming-in-the-Small. IEEE Transactions on Software Engineering, 2(2), June 1976. Jacky Estublier, Configuration Management: The Notion and the Tools. Proc. International Workshop on Software Version and Configuration Control, Teubner Stuttgart, 1988. Nico Habermann, Lawrence Flon, and Lee Cooprider, Modularization and Hierarchy in a Family of Operating Systems. Communications of the ACM, July, 1976. Intermetrics Corp., Draft Ada 9X Mapping Document. Ada 9X Project Office, Ada Joint Program Office, February 19, 1991, pp 10-1 to 10-5. Ronald L. Lange and Robert W. Schwanke, Software Architecture Analysis: A Case Study, Proc. Third International Workshop on Software Configuration Management, ACM Press, June, 1991. David L. Parnas, On the Criteria To Be Used in Decomposing Systems Into Modules. Technical Report, Computer Science Department, Carnegie-Mellon University, 1971. David L. Parnas, Information Distribution Aspects of Design Methodology. Information Processing 71, North-Holland Publishing Company, 1972. Robert W. Schwanke, Ellis S. Cohen et. al., Configuration Management in BiiN SMS, Eleventh IEEE International Conference on Software Engineering, IEEE Computer Society Press, May, 1989. Robert W. Schwanke, Rita Z. Altucher, and Michael A. Platoff, Discovering, Visualizing, and Controlling Software Structure. Proc. Fifth International Workshop on Software Specification and Design, IEEE Computer Society Press, 1989. Robert W. Schwanke, An Intelligent Tool for Re-engineering Software Modularity. Proc. Thirteenth IEEE International Conference on Software Engineering, IEEE Computer Society Press, 1991. Robert W. Schwanke and Stephen Jose Hanson, Using Neural Networks to Modularize Software. Submitted to Machine Learning. Walter F. Tichy, Tools for Software Configuration Management. Proc. International Workshop on Software Version and Configuration Control, Teubner Stuttgart, 1988. Amos Tversky, Features of Similarity, Psychological Review, 84(4), July, 1977. Juergen F. H. Winkler, Program-Variations-in-the-Small. Proc. International Workshop on Software Version and Configuration Control, Teubner Stuttgart, 1988.

In accordance with another aspect of the invention, a method for identifying software objects that have been assigned to a wrong group, wherein the similarity between objects is known, such as by evaluating a similarity function, comprises the steps of:

(a) checking each object to see whether it belongs to its current group with K peers and confidence N;

(b) checking whether said each object belongs to another group with a lower and therefore better confidence rating.

In accordance with yet another aspect of the invention, a method for identifying software objects that have been assigned to a wrong group, wherein the similarity between objects is determined, such as by evaluating a similarity function, and wherein the input comprises a set of software objects, assigned to various groups, peer parameter K, and confidence parameter N, said method comprising the steps of:

(a) determining the similarity between each pair of objects, such as by computing a similarity function such as Feature Ratio With Linking;

(b) for each object O, (b.1) sorting O's neighbors, nearest first, (b.2) examining O's neighbors in order, counting how many of them are assigned to one or another group, until K are found that are assigned to the same group, recording the group name, say G, and the number of neighbors examined, say E, (b.3) if G is the group to which O is currently assigned, marking O as being correctly classified with confidence E−K and skipping to step (c), and (b.4) otherwise, continuing examining the neighbors in order until K have been found that are assigned to the same module as O, or until all neighbors have been examined, recording the number of neighbors examined, say F, marking O as being misclassified, with confidence F−K, and as likely belonging to group G with confidence E−K;

(c) sorting the misclassified objects according to their mis-classification confidence, greatest first (here "greater" corresponds to "worse"), and outputting the list, reporting for each object the current group assignment, the mis-classification confidence, the group that the object likely belong to, and the confidence with which it likely belongs; and (d) sorting the objects that are correctly classified but with confidence greater than N (here "greater" corresponds to "worse"), sorting by confidence, greatest first, and outputting the sorted list, reporting for each object the confidence with which it belongs to the module to which it is currently assigned.

In accordance with another aspect of the invention, a method for identifying software objects that have been assigned to a wrong group, wherein the similarity between objects is determined, such as by evaluating a similarity function, and wherein the input comprises a set of software objects, assigned to various groups, peer parameter K, and confidence parameter N, said method comprises the steps of:

(a) determining the similarity between each pair of objects, such as by computing a similarity function such as Feature Ratio With Linking;

(b) for each object O, (b.1) sorting O's neighbors, nearest first, (b.2) examining O's neighbors in order, counting how many of them are assigned to one or another group, until K are found that are assigned to the same group, recording the group name, say G, and the number of neighbors examined, say E, (b.3) if G is the group to which O is currently assigned, marking O as being correctly classified with confidence and skipping to step (c), and (b.4) otherwise, continuing examining the neighbors in order until K have been found that are assigned to the same module as O, or until all neighbors have been examined, recording the number of neighbors examined, say F, marking O as being misclassified, with confidence F-K, and as likely belonging to group G with confidence E-K; and (c) sorting the misclassified objects according to their confidence ratings.

4. A method for identifying software objects that have been assigned to a wrong group, wherein the similarity between objects is determined, such as by evaluating a similarity function, and wherein the input comprises a set of software objects, assigned to various groups, peer parameter K, and confidence parameter N, said method comprising the steps of:

(a) determining the similarity between each pair of objects, such as by computing a similarity function such as Feature Ratio With Linking;

(b) for each object O, (b.1) sorting O's neighbors, nearest first, (b.2) examining O's neighbors in order, counting how many of them are assigned to one or another group, until K are found that are assigned to the same group, recording the group name, say G, and the number of neighbors examined, say E, (b.3) if G is the group to which O is currently assigned, marking O as being correctly classified with confidence E-K and skipping to step (c), and (b.4) otherwise, continuing examining the neighbors in order until K have been found that are assigned to the same module as O, or until all neighbors have been examined, recording the number of neighbors examined, say F, marking O as being misclassified, with confidence F-K, and as likely belonging to group G with confidence E-K; and (c) sorting the misclassified objects by assigning a priority to a misclassified object according to its similarity to its nearest bad neighbor and an output list is sorted by priority.

In accordance with still another aspect of the invention, a method for identifies software objects in accordance with claim 2, wherein the similarity between objects is determined by using feature ratio with linking.

In accordance with yet another aspect of the invention, a method for identifying software objects that have been assigned to a wrong group, and wherein the input comprises a set of software objects, assigned to various groups, peer parameter K, and confidence parameter N, said software objects comprising the static declaration units of a program and having non-local identifiers that designate them, a coefficient k controlling how important the invoker-invokee relationship is in computing similarity, relative to the importance of having common features, a coefficient d controlling how sensitive the measure is to distinctive features, a coefficient n controlling how sensitive similarity is to the total weight of the common features, said method comprises the steps of:

(a) determining the similarity between each pair of objects, whereof typical first and second software objects, hereinafter referred to as "A" and "B", being declared to be within said system, coefficients for the similarity function being in this case designated "k", "n", and "d"; and bias multipliers being designated for predetermined features, each of said bias multiplier comprising a feature name and a positive number;

(b) using a conventional cross-reference extractor to identify all of the software objects declared in said system, to generate a unique name for each non-local identifier, and to locate each occurrence of a non-local identifier;

(c) For each occurrence of a non-local identifier, determining the unique name of the identifier, herein referred to as "Y", and the unique name of the object wherein it occurs, herein designated "X" and assigning to "X" the feature "uses-Y", and assigning to "Y", if it is a software object, the feature "used-by-X" and if one of X and Y already had the feature just assigned to it, not duplicating these feature assignments;

(d) To each feature named in step (c), herein designated "f", assigning a weight $Wf = -\log$ (probability (f));

(e) For each bias multiplier specified in the input, recomputing the weight of that feature by multiplying its Shannon information content by the specified multiplier;

(f) Comparing the features of objects A and B, and dividing them into three sets, a first set being AB the features that both A and B have, a second set being the features that A−B has and B does not, and a third set being the features that B has and A does not B−A;

(g) Computing the sums of the weights of the features in each of said three sets, denote these, $F(A \cap B)$, $F(A-B)$, and $F(B-A)$, respectively;

(h) Computing the similarity of A and B by a monotonic, matching function, which must also satisfy the constraint that if the set is empty, and neither object uses the name of the other object, the similarity is O;

(i) determining the similarity between each pair of objects, such as by computing a similarity function such as Feature Ratio With Linking;

(j) for each object O, (j.1) sorting O's neighbors, nearest first, (j.2) examining O's neighbors in order, counting how many of them are assigned to one or another group, until K are found that are assigned to the same group, recording the group name, say G, and the number of neighbors examined, say E, (j.3) if G is the group to which O is currently assigned, marking O as being correctly classified with confidence E-K and skipping to step (k), and (j.4) otherwise, continuing examining the neighbors in order until K have been found that are assigned to the same module as O, or until all neighbors have been examined, recording the number of neighbors examined, say F, marking O as being misclassified, with confidence, and as likely belonging to group G with confidence;

(k) sorting the misclassified objects according to their mis-classification confidence, greatest first, and outputing the list, reporting for each object the current group assignment, the mis-classification confidence, the group that the object likely belong to, and the confidence with which it likely belongs;

(l) sorting the objects that are correctly classified but with confidence greater than N (here "greater" corresponds to "worse"), sorting by confidence, greatest first, and outputing the sorted list, reporting for each object the confidence with which it belongs to the module to which it is currently assigned.

A set of methods for providing heuristic advice on modularity is herein disclosed, including an adaptation mechanism that automatically "tunes" the heuristic to the preferences of the software architects.

There follows first a discussion of the information hiding principle and then description of a heuristic measure of information sharing. Thereafter, two services that provide heuristic advice for modularizing existing code, and the results achieved with these services are described. One service, clustering, identifies clusters of software objects that share enough design information that they belong together in the same module. The other service, maverick analysis, identifies individual software objects that appear to be in the wrong module, because they share more information with procedures in other modules than with procedures in their own module.

Both services present lists of suggestions, which the architect can accept or reject. The lists are long enough that they must be prioritized, so that the architect can tackle the problems "worst first". As the architect does so, she sometimes finds that she disagrees with Arch's recommendations, because (for example) she believes that encapsulating one data type is more important than encapsulating another. Since the similarity measure incorporates a weight representing the importance of each non-local identifier in the system, it can be adapted to the architect's preferences by increasing the weights of some production code show that heuristic analysis provides useful information to practicing maintainers, and that hand-tuning a few of the weights can make Arch and the maintainer agree most of the time.

However, the tuning process is too tedious and demanding to expect an architect to do it. Instead, there is disclosed herein an automatic tuning method. It is essentially a curve-fitting method, which takes a set of approved modules and their approved members, and finds coefficients for the similarity measure that minimizes the number of apparently misplaced software objects. The method is a gradient descent method that combines and extends several neural network design and training methods. The results of experiments which show that an automatically-tuned similarity function can assign a new software object to the correct existing module with very high accuracy are described.

One potential problem with automatic tuning is that, if the measure is tuned too closely to the data, then Arch will have no suggestions to make, because the fitting process assumes that the given modules are correct. To prevent this, the weight coefficients are given initial values based on objective information measures of the code itself, without any architect's input, and create an initial list of suspect objects. The weights are changed only when the architect rejects a suggestion, and are only changed "just enough" to make Arch agree with the architect.

By this adaptation method, the architect is freed from laborious hand-tuning. She only needs to say "yes" or "no" to specific suggestions, and can expect the tool to adapt to her preferences.

In the subject of modularity it has been stated by David L. Parnas, a writer on the subject, that the connections between modules are the assumptions which the modules make about each other and that in most systems it is found that these connections are much more extensive than the calling sequences and control block formats usually shown in system structure descriptions. See e.g. David L. Parnas, Information Distribution Aspects of Design Methodology, Information Processing 71, North Holland Publishing Company, 1972. It has been further stated by Parnas when he formulated the information hiding" criterion, advocating that a module should be characterized by a design decision which it hides from all others. Its interface or definition is chosen to reveal as little as possible about its inner workings. See David L. Parnas, "On the Criteria to be Used in Decomposing Systems Into Modules", Technical Report, Computer Science Department, Carnegie-Mellon University, 1971.

According to Parnas, the design choices to hide are those that are most likely to change later on. Good examples are data formats, user interface (I/O formats, window vs. typescript, choice of window management system), hardware (processor, peripheral devices), and operating system.

In practice, the information hiding principle works in the following way. First, the designers identify the role or service that the module will provide to the rest of the system. At the same time, they identify the design decisions that will be hidden inside the module. For example, the module might provide an associative memory for use by higher-level modules, and conceal whether the memory is unsorted or sorted, all in memory or partly on disk, and whether it uses assembly code to achieve extra-fast key hashing.

The module description is then refined into a set of procedures, data types, and other software objects that other modules may use when interacting with the associative memory. For example, the associative memory might provide operations to insert, retrieve, modify, and remove records. These four operations would need parameters specifying records and keys, and some way to determine when the memory is full. It would declare and make public the data types "Key" and "Record", and the procedures "Insert", "Retrieve", "Modify", and "Remove".

Next, the associative memory module is implemented as a set of procedures, types, variables, and macros that together make, for example, a large in-core hash table. The implementation can involve additional procedures and types beyond the ones specified in the interface; only the procedures belonging to that module are permitted to use these "private" declarations. Many design decisions are represented by specific declarations, such as HashRecord array HashTable[TableSize] which embodies the decision to store hash records in a fixed-size table rather than, say, a linked list or tree. Procedures that depend on such design decisions normally use the corresponding declarations, for example, proc Retrieve(KeyWanted: Key) Index=Hash(KeyWanted)
if HashTable[Index].Key equals KeyWanted return HashTable.Record
else return FAILURE Procedures outside the associative memory module cannot, for example, determine which order the records are stored in, because they cannot use the name HashTable. Later, if the implementor should decide to replace the hashing algorithm, or even to use a sorted tree, all of the code that he would need to change would be in the associative memory module.

A simple information sharing heuristic for detecting when two software objects share a design decision is herein recognized from the above example:

If two software objects use several of the same unit-names, they are likely to be sharing significant design information, and are good candidates for placing in the same module.

A unique aspect bearing on the present invention is that design coupling is measured, rather than data or control coupling. A simple example will illustrate the difference. Consider four procedures, A, B, C, and D and a table, T. Procedure A calls procedure B to write information into table T. Procedure D reads information from the table. Procedure C also writes information into table T. Procedures A and B have a control link between them, because A calls B. Procedures B and D have a data link between them, because data passes from B to D through the table. Likewise, A and B are data-linked through parameters, and C and D are data-linked through T. However, B and C are not data-linked, because both of them put data into T, but neither one takes data out. Finally, B, C, and D have a design link among them, because all three share assumptions about the format and interpretation of table T. If one of the procedures ever needs to be rewritten in a way that affects the table T, the other two should be examined to see if they require analogous changes.

Before Parnas's work referred to above, it was commonplace to divide a system into modules that each represented a major computational step of the program. For example, a compiler would be divided into a lexical analyzer, a syntax analyzer, a semantic analyzer, and an optimizer. The lexical analyzer would include a procedure for inserting symbols into the symbol table; the other modules would contain routines for retrieving information from the symbol table. The format of the symbol table itself would be exposed to all of the modules, so that a change in its format required the programmer to review every module to see what the impact would be. Nowadays, programmers generally agree that it is more important to group together procedures that share data, than to group procedures that call one another.

Ideally, it may appear to be desirable that the clear, simple concepts contained in a system's original design be faithfully adhered to throughout the software's lifetime. However, the implementation process always uncovers technical problems that lead to changes in the design. Furthermore, design decisions are almost never so clearly separable that they can be neatly divided into subsystems and sub-subsystems. Each decision interlocks with other decisions, so that inevitably there are some decisions that cannot be concealed within modules, even though they are likely to change. These typically show up as public variables and unprotected data types.

Private declarations are not the only design decisions that may be shared among software objects. Module interface specifications also represent design decisions, although the designers typically hope that they will change less often. Even so, in many cases a certain interface procedure is only used in one or two other modules in a system, and represents a design decision on which all of the using procedures depend.

Good modularity is highly subjective. Not only must the designers select good abstract roles for the modules to implement, but they must try to predict what kinds of changes are likely to happen to the system in the future. Then they must determine which design decisions can be hidden within modules, and which ones must be shared. Finally, they must adapt the module specifications to the project team that is building them, incorporating both technical and non-technical influences.

Therefore, modularization as a reverse-engineering process must be treated heuristically, rather than by a formal set of rules. The information hiding heuristic suggests that "belonging together" is proportional to "shared declarations". Arch uses a similarity function that measures information sharing based on shared declarations, and uses it to give the architect advice on how to modularize or remodularize a system.

To turn the information sharing heuristic into an actual similarity function, Arch profits from research on human similarity judgment, in the field of cognitive science. One particular model, Tversky's Ratio Model corresponds to an intuitive notion of how humans judge that two software objects share design information. This section outlines that model, and describes how to adapt it to the present problem domain. First, however, the software features on which the similarity function is based are defined.

The information sharing heuristic is based on the non-local names that software objects use. More formally, a non-local name is any name whose scope includes two or more software objects' bodies. Arch assigns a unique identifier to each such name, to distinguish multiple declarations of the same identifier (in different scopes). Every non-local name is a potential feature name. Every non-local name appearing in the body of a software object is a feature of that object.

Sometimes, two or more objects are placed together in the same module because they are called from the same other objects. Therefore, whenever object A names object B, not only does A receive the feature "B", but B receives the feature "named-by-A".

For the C language, a cross-reference extractor based on the Unix utility cxref that collects all occurrences of non-local names, including the names of procedures, macros, typedefs, variables, and even the individual field names of structured types and variables is utilized.

In agreement with Tversky's work, the following requirements for a software similarity measure are identified:

Matching: Similarity must be a function of the features common to the two objects, or distinctive to one or the other. It should not be a function of how many possible features are missing from both objects.

Monotonicity: Adding a common feature to two objects must increase their similarity. Adding a distinctive feature to one of them must decrease similarity.

The relative significance of two features must be independent of whether they are common or distinctive. As a whole, common features may be more or less significant than distinctive features, but individual variations are not permitted.

The similarity between two objects with no common features must be zero.

Exception: Arch's actual similarity measure has an additional term representing whether or not one of the objects invokes the other. This term is ignored in the requirements above.

Let A, B, C, . . . be objects described by sets of features a, b, c, . . . , respectively. Each member of a feature set is the name of a characteristic that is true of the corresponding object. Then common and distinctive features are defined as:

$a \cap b$ The set of features that are common to A and B.
$a - b$, $b - a$

The sets of features that are distinctive to A or B, respectively.

A function, SIM, has the matching property if there exists functions F and f such that $$SIM(X,Y) = F(f(x \cap y), f(x-y), f(y-x))$$

This assures that the significance of a set of features occurring in one or both of the compared objects is computed without reference to whether the features are common or distinctive. It also assures that similarity is independent of any other features.

A function, SIM has the monotonicity property if $$SIM(A,B) \geq SIM(A,C)$$

whenever $$a \cap b \geq a \cap c$$

$$a - c \geq a - b$$

$$c - a \geq b - a$$

and, furthermore, the inequality is strict whenever at least one of the set inclusions is proper.

Note that monotonicity is based only on the set inclusion ordering, and not on the number or weight of the features. Thus, monotonicity does not by itself ensure that the more-similar-than relation is a total ordering.

Tversky proposed two similarity functions that were intuitive, easy to compute, and satisfied the matching and monotonicity properties. One of them, the Ratio Model, seems well suited to comparing software objects, because its value is zero in the absence of shared features. Arch's similarity function, although developed independently, has a nearly identical form. Its components are described first:

The weight of a feature is a positive, real number representing its importance, relative to other features. The weight used is the same whether the feature is common or distinctive. Although Tversky's theory permits other aggregate weight functions, the present Inventor has found the linear sum to be sufficient. The predicate Linked is needed because invoker-invokee relationships must be considered in module formation, in addition to information sharing. Observations of real software confirm that small software objects with few non-local identifiers in them are frequently grouped with their invokers.

The similarity function used in Arch is defined as follows:

$$SIM(A, B) = \frac{W(a \cap b) + k \cdot \text{Linked}(A, B)}{n + W(a \cap b) + d \cdot (W(a - b) + W(b - a))}$$

It is noted that:

All coefficients are non-negative.

Only shared and distinctive features count. The similarity of two objects is not affected by adding unrelated declarations (features) to the program.

Similarity increases with shared features and decreases with distinctive features. The constant d controls the relative importance of common and distinctive features.

If there are no common features, and neither object invokes the other, similarity is zero.

The constant n controls normalization. For example, if n is 0, then all similarities are normalized between 0 and 1 (ignoring the Linked term). However, if n is large, then similarities are not normalized. The similarity of two objects, A and B, with identical feature sets x would then be $$\frac{W(X) + k \cdot \text{Linked}(A, B)}{n + W(X)}$$

showing that objects with large numbers of features could be more similar to other objects than could objects with few features.

SIM (A,B) = SIM (B,A)

The problem still remains of how to assign weights to the features, and values to k, n, and d. Ideally, the heavily-weighted features would be the names corresponding to hidden design decisions. However, there is no direct way of determining which identifiers should be hidden. At first, all features were given the same weight, but it was found that frequently-occurring features dominated the performance of the present classifier, and rare features were ignored. More recently, the significance of a feature f has been estimated by its Shannon information content:

$$w_f = -\log(\text{Probability}(f))$$

where the probability of f is the fraction of all objects that have feature f. This gives rarely-used identifiers higher weights than frequently-used identifiers, in keeping with the idea that rare names are more likely to be hidden in modules than frequently-used ones.

Values for k, n, and d selected by trial and error. (k=5, n=100, and d=1 seem to be good starting points.

Feature ratio with linking is a method used for computing the similarity between two software objects, for use in clustering and classification, and for critiquing existing categories. These categories are used, for example, as software files, modules and subsystems. Software objects are typically the static declaration units of the program, including procedures, types, variables, macros, classes, methods, et cetera. For a particular application, only a subset of the declaration units in a system may be considered when computing similarity. Therefore, this method distinguishes between "software objects" and "non-local identifiers". All software objects will have non-local identifiers that designate them, but not all non-local identifiers will designate software objects. The coefficient k controls how important the invoker-invokee relationship is in computing similarity, relative to the importance of having common features. The coefficient d controls how sensitive the measure is to distinctive features. The coefficient n controls how sensitive similarity is to the total weight of the common features.

1. Inputs: a software system: two software objects, hereinafter referred to as "A" and "B", declared within that system; coefficients for the similarity function, in this case "k", "n", and "d"; and bias multipliers for some features. Each such bias multiplier consists of a feature name and a positive number.

2. Use a conventional cross-reference extractor to identify all of the software objects declared in the system, to generate a unique name for each non-local identifier, and to locate each occurrence of a non-local identifier.

3. For each occurrence of a non-local identifier, determine the unique name of the identifier, say "Y", and the unique name of the object in which it occurs, say "X". Assign to "X" the feature "uses-Y", and assign to "Y" (if it is a software object) the feature "used-by-X". If X or Y already had the feature just assigned to it, do not duplicate these feature assignments.

4. To each feature named in step [3.], say "f", assign a weight $W_f$. One way of computing an appropriate weight is by its Shannon information content, $W_f = -\log$ (probability f), where the probability is the fraction of the software objects in the system that have that feature.

5. For each bias multiplier specified in the input, recompute the weight of that feature by multiplying its assigned weight by the specified multiplier.

Compare the features of objects A and B, and divide them into three sets: a∩b, being the features that both A and B have; a−b, being the features that A has and B does not, and b−a, being the features that B has and A does not.

7. Compute the sums of the weights of the features in each of the three sets. Denote these W(a∩b), W(a−b), and W(b−a), respectively.

Compute the similarity of A and B by a monotonic, matching function, which must also satisfy the constraint that if the set a∩b is empty, and neither object uses the name of the other object, the similarity is 0. One such function is $$SIM(A, B) = \frac{W(a \cap b) + k \cdot \text{Linked}(A, B)}{n + W(a \cap b) + d \cdot (W(a - b) + W(b - a))}$$

9. Output the computed similarity.

Re-engineering modularity includes both discovering the latent structure of existing code, and changing that structure to obtain better modularity. Arch supports three different (although overlapping) styles of re-engineering work:

Incremental change: the software is already organized into high-quality modules. The architect wishes to identify individual weak points in the architecture, and repair them by making small changes.

Moderate reorganization: although the software is already organized into modules, their quality is suspect. The architect wishes to reorganize the code int new modules, but with an eye to preserving whatever is still good from the old modularity.

Radical (re)organization: Either the software has never been modularized, or the existing modules are useless. The architect wishes to organize the software without reference to any previous organization.

Arch supports these activities with two kinds of intelligent advice: clustering and maverick analysis.

Clustering and Reclustering are services that organize software objects into a subsystem hierarchy, by hierarchical agglomerative clustering. They can be run in batch or interactively, and can use a pre-existing modularization to reduce the amount of human interaction needed. The architect uses the resulting categories as proposals for new modules.

The basic clustering algorithm is called hierarchical, agglomerative clustering. It proceeds as follows:
1 Place each software object in a group by itself
2. Repeat
2.a. Identify the two most similar groups
2.b. Combine them until the existing groups are satisfactory The resulting groups are then used to define the memberships of modules.

Similarity between groups is defined by a group similarity measure, of which several are experimented with. Termination may be based on computed criteria or on the architect's judgment.

Arch supports several variations on this algorithm, including batch clustering, interactive clustering, and reclustering.

Batch clustering: one form of this algorithm is disclosed in U.S. patent application Ser. No. 07/525,376, entitled METHOD FOR SOFTWARE STRUCTURE ANALYSTS USING CONCEPTUAL CLUSTERING, filed May 17, 1990.

Interactive clustering is a method that uses a group similarity measure to decide which groups to combine, and provides a manual override mechanism at each step to allow the analyst to make manual changes between automatic clustering steps. The algorithm is performed as follows:

1. Select a group similarity measure, from the following list. These measures are described shortly:
Complete Link
Average Link
Single Link
Median Link
Percentile Link
K'th Link
Neighborhood Link
Two Neighborhood Link 2. Start with a set of groups, each containing software objects.

3. Repeat
3.a. Identify the two most similar groups according to the group similarity measure. Do not consider pairs that the analyst has previously disapproved.
3.b. If the analyst disapproves of the identified pair (described under the heading The Analyst's Approval on page 9), set it aside and repeat step 3.a.
3.c. Combine the identified pair, either by merging the two groups, making one group a subgroup of the other, or making a supergroup containing the two subgroups.

4. Stop repeating step 3. When the analyst is satisfied with the current set of groups, or there are only two groups left, or the maximum similarity between any pair of groups is 0.

Interactive Clustering Device is a device for clustering software objects into groups. It can be built using any reasonable software similarity function. It automates parts of the clustering process, subject to an operator's control. It supports a variety of alternative group similarity measures. It stores partial results of the clustering process, including specific choices read in as input. It performs clustering steps automatically whenever it has enough information about specific choices to do so. When it does not have enough information, it displays a "recommended" clustering step, with several good alternative steps, and waits for further input. It supports a batch mode, in which clustering decisions are automatically approved unless explicitly disapproved by specific choices, and an interactive mode, in which the decisions must be displayed for approval unless they are explicitly approved by specific choices. It supports a "labelling" mode, in which clustering decisions that concur with a previous grouping of the objects, are automatically approved.

The device contains storage locations for each of the following:

1. A switch indicating which group similarity measure has been selected.

2. A switch indicating whether "interactive" or "batch" clustering is to be performed.
3. A set of objects to be grouped
4. A set of groups containing these objects
5. A set of lists describing specific choices
5.a. A never-list
5.b. A not-exactly list
5.c. A same-label list
5.d. A suspension list
6. A labelling enabled/disabled switch
7. A display for a current recommended pair of groups to combine, and several alternative groups
8. A display of permissible labels for groups The device reads in commands that select operations it is to perform. Some commands input additional data that affect the outcome of the operation. Each of the operations is described separately, below. The inputs for each operation are given in parentheses. The operations are:

1. Enable labelling
2. Disable labelling
3. Enable batch clustering
4. Enable interactive clustering
5. Prepare to cluster (set of objects)
6. Select Group Similarity Function (function name)
7. Set Parameter of Similarity Function (parameter-name, value)
8. Add to list (list-name, element name)
9. Delete from list (list-name, element name)
10. Set minimum group size (integer)
11. Set maximum automatic group size (integer)
12. Select group (group name)
13. Unselect group (group name)
14. Add permissible label (label)
15. Select label
16. Combine selected groups
17. Cluster
18. Combine and cluster
19. Output The working each of these operations will next be described.

A. Enable labelling
Sets labelling switch to "enabled".
B. Disable labelling
Sets labelling switch to "disabled".
C. Enable batch clustering
Sets batch/interactive switch to "batch"
D. Enable interactive clustering
Sets batch/interactive switch to "interactive"
E. Prepare to cluster (set of objects)
(1) Inputs: a set of software objects, and, for each object, the name of a module to which it belongs.
(2). Place each software object in a newly-created group by itself, so that there are exactly as many groups as input objects. If labelling is enabled, label each group with the name of the module to which its only member belongs. Store these groups in memory.
F. Select Group Similarity Function (function name, coefficients)
1. Input: the name of a group similarity function, from the following list: single link, average link, complete link, median link, percentile link, K'th link, neighborhood link, two neighborhood link. For those functions that require coefficients, the appropriate coefficients are also input.
2. Record the function name and inputs in the memory.
G. Set Parameter of Similarity Function (parameter-name, value).
1. Inputs: the name of a parameter of the similarity function (k, n, or d) and a new value for that parameter.
2. Records the new value for the parameter in the memory.
H. Add to list (list-name, element)
1. Inputs: the name of a prior-decision list, and an element to add to that list.
1.a. If the list-name is "never", the element is a pair of lists of objects.
1.b. If the list-name is "not-exactly", the element is a pair of lists of objects.
1.c. If the list-name is "suspension", the element is a list of objects.
1.d. If the list-name is "same-label", the element is a list of objects.
2. Add the element to the named list, if it is not already there.
I. Delete from list (list-name, element name)
1. Inputs: the name of a prior-decision list, and an element to add to that list.
1.a. If the list-name is "never", the element is a pair of lists of objects.
1.b. If the list-name is "not-exactly", the element is a pair of lists of objects.
1.c. If the list-name is "suspension", the element is a list of objects.
1.d. If the list-name is "same-label", the element is a list of objects.
2. Remove the element from the named list, if it is there.
J. Set minimum group size (integer)
1. Input: an integer
2. Record the integer as the minimum group size.
K. Set maximum automatic group size (integer)
1. Input: an integer
2. Record the integer as the maximum automatic group size.
L. Select group (group)
1. Input: a list of objects.
2. If the list of objects is a subset of a group in the memory, mark that group as "selected".
M. Unselect group (group)
1. Input: a list of objects.
2. If the list of objects is a subset of a group in the memory, mark that group as "unselected".
N. Add permissible label (label)
1. Input: a name
2. Add that name to the list of permissible labels, if it is not already there
O. Select label (label)
1. Input: a label
2. Records that label as being the one currently "selected", replacing any previously selected label.
P. Combine selected groups under label
1. Merge all selected groups into a single group. If labelling is enabled, label that group with the currently selected label.
Q. Cluster This operation uses the information recorded in the device's memory to carry out zero or more automatic clustering steps. It stops when the pair of groups that are most similar cannot be approved for merging automatically. It displays this pair and waits for further input.

1. Compute the similarity between each pair of groups in the memory, using the similarity measure selected by operation F.

2. Identify the most similar pair of groups. If the similarity is 0, skip to step [4.]

3. Determine whether the identified pair can be automatically rejected or accepted, as follows:

3.a. If the pair is on the not-exactly-list, set this pair aside, identify the next-most-similar pair of groups, and repeat step [3.]

3.b. If a pair on the never-list is embedded in the pair being checked (i.e. each member of the pair being checked is a superset of the corresponding group in the never-list pair), set this pair aside, identify the next-most-similar pair of groups, and repeat step [3.]

3.c. If one of the groups in the pair is on the suspension list, set this pair aside, identify the next-most-similar pair of groups, and repeat step [3.]

3.d. If labelling is enabled, the two groups have different labels, and one of the groups is on the same-label list, set this pair aside, identify the next-most-similar pair of groups, and repeat step [3.]

3.e. If none of the rules above apply, and the combined group size would be less than or equal to the minimum group size: merge the two groups into a single group; if labeling is enabled, label the new group with the label from the larger of the two previous groups; go back to step [1.]

3.f. If the combined group size would be greater than the maximum automatic group size, and the batch/interactive switch is set to "interactive", skip to step[4.]

3.g. If the combined group size would be greater than the maximum automatic group size, and the batch/interactive switch is set to "batch", set this pair aside, identify the next-most-similar pair of groups, and repeat step [3.]

3.h. If labelling is enabled, and the two groups have different labels, skip to step [4.]

3.i. If the batch/interactive switch is set to "interactive", skip to step [4.]

3.j Merge the two groups into a single group; if labeling is enabled, label the new group with the label from the larger of the two previous groups; go back to step [1.]

4. Display the pair of groups on the screen. For each group, also display the group that is next most-similar to it. If labelling is enabled, also display, for each member of the pair, the group having the same label that is most similar to it.

R. Combine and cluster: This operation consists exactly of the combine operation followed by the cluster operation.

S. Output

Outputs the groups contained in the memory.

GROUP SIMILARITY MEASURES

Complete Link

The similarity between groups is the minimum similarity between pairs of procedures from different groups.

Average Link

The similarity between groups is the average similarity between pairs of procedures from different groups.

Single Link

The similarity between groups is the maximum similarity between pairs of procedures from different groups.

Median Link

The similarity between groups is the median similarity between pairs of procedures from different groups.

Percentile Link

The similarity between groups is the p'th percentile similarity between pairs of procedures from different groups, for a specified value of p between 0.0 and 100.0.

K'th Link

The similarity between groups is the k'th greatest similarity between pairs of procedures from different groups, for a specified value of k.

Neighborhood Link and Two Neighborhood Link

These similarity measures are defined by the following algorithms.

Neighborhood Link Similarity is a method for computing the similarity between two groups of objects, for use in software clustering. The method is used when it is known that only objects that are "near neighbors" to a given object should be considered when computing similarity. Specifically, for some positive integer "Y", only the Y-nearest neighbors should be considered. It also assumes that the similarity between any pair of objects can be computed by a similarity function.

1. Input, a set of groups containing software objects, including two specific groups, A and B, and an integer value for Y.

2. For each object, identify its Y nearest neighbors (hereafter called its Y-neighbors).

3. For each pair of objects for which neither is a Y-neighbor of the other, redefine the similarity between them to be 0.

4. The similarity between A and B is the maximum (possibly redefined) similarity between any object in A and any object in B.

Two Neighborhood Link Similarity is a method for computing the similarity between two groups of objects, for use in software clustering. The method is used when it is known that only objects that are "near neighbors" to a given object should be considered when computing similarity. Specifically, for some positive integer "Y", only the Y-nearest neighbors should be considered. Furthermore, for some smaller integer "X", when an object is in the same group as at least X of its Y nearest neighbors, none of the other neighbors matter. The method also assumes that the similarity between any pair of objects can be computed by a similarity function.

1. Input: a set of groups containing software objects, two specific groups, A and B, and two integer values for X and Y.

2. For each object, identify its X nearest neighbors (hereafter called its X-neighbors).

3. For each object, identify its Y nearest neighbors (hereafter called its Y-neighbors).

4. For each pair of objects for which neither is a Y-neighbor of the other, redefine the similarity between them to be 0.

5. For each pair of objects, each of whose X-neighbors are all in the same group as the object itself, redefine the similarity between them to be 0.

6. The similarity between groups A and B is the maximum similarity between any object in A and any object in B.

Reclustering is a method that is the same as interactive clustering, except that the method starts with additional information indicating that certain clustering decisions will automatically be accepted. The portions of the algorithm that are different are highlighted.

1. Select a group similarity measure, from the following list:
Complete Link
Average Link
Single Link
Median Link
Percentile Link
K'th Link
Neighborhood Link
Two Neighborhood Link 2. Start with a set of named original-groups, each containing objects.
3. Select a maximum auto-group size.
4. Label each object with the name of the original-group in which it resides.
5. Reassign each object to a new group, of which it is the sole member.
6. Label each group with the label of its member.
7. Repeat
7.a. Identify the two most similar groups according to the group similarity measure. Do not consider pairs that the analyst has previously disapproved.
7.b. If the two groups have the same label, and their combined size is less than or equal to the maximum auto-group size, merge them and go back to step 6.a. Otherwise, if the analyst disapproves of the identified pair, set it aside and repeat step 6.a.
7.c. Combine the identified pair, either by merging the two groups, making one group a subgroup of the other, or making a supergroup containing the two subgroups.
7.d. Label the group as specified by the analyst.
8. Stop repeating step 6. When the analyst is satisfied with the current set of groups, or there are only two groups left, or the maximum similarity between any pair of groups is 0.

In all of the interactive clustering methods above, combining two groups is subject to the analyst's approval. The following method describes how to determine that approval.

1. Establish the never-list, containing pairs of objects that should not be placed in the same group, even after one or both of them have been combined with other groups.
2. Establish the not-exactly-list, containing pairs of groups that should not be combined, unless one or both of them have first been combined with other groups.
3. Establish the suspension list, containing groups that should not be combined with any other group.
4. Establish the same-label-list, containing groups that should only be combined with groups having the same label.
5. Establish the minimum group size.
6. Before starting the clustering algorithm, ask the analyst to specify the initial contents of each list, and the two group size parameters.
7. To determine the analyst's approval for a pair of groups,
7.a. If the combined group size would be less than or equal to the minimum group size, it is automatically approved.
7.b. If the pair is on the not-exactly-list, it is disapproved.
7.c. If a pair on the never-list is embedded in the pair being checked (i.e. each member of the pair being checked is a superset of the corresponding group in the never-list pair), the checked pair is not approved.
7.d. If one of the groups in the pair is on the suspension list, the pair is disapproved.
7.e. If the algorithm is using labels, the two groups have different labels, and one of the groups is on the same-label list, the pair is disapproved.
7.f. If none of the rules above apply, present the pair to the analyst, permit him to modify the contents of any of the lists, rearrange the groups, or change the minimum group size, and then recheck the pair by the rules above. If they still do not apply, the pair is approved.

Batch approval: any of the clustering methods that request approval can be converted into a "batch" method by having the analyst prepare the disapproval lists before starting the algorithm, and agree, in advance, to all pairs not excluded by one of the lists.

Good and Bad Neighbors: the following definitions are very useful for discussing comparisons among objects and across module boundaries:

Subject: An object that is being compared to several other objects, for purposes of clustering or classification.

Neighbor: A neighbor of a subject is any object with which it has at least one feature in common.

Good Neighbor: A subject's good neighbors are those neighbors g to the same module as it does.

Bad Neighbor: A subject's bad neighbors are those that belong to than it does.

Maverick Analysis: a maverick is a misplaced software object. Arch detects potential mavericks by finding each object's most similar neighbors, and noticing which modules they belong to. More formally, it can be said that An object O belongs to category M, with K peers and confidence N, if N is the least integer for which the object's nearest neighbors include K neighbors from category M. Given K and N, an object O, currently assigned to category M, is a maverick unless (a) there exists an such that O belongs to M, with K peers and confidence n, and (b) if O belongs to M', with K peers and confidence n', then $n' > n$.

The present inventor has found that simply looking at the single nearest neighbor was not sufficient, because sometimes it is the neighbor that is the maverick and not the subject itself. In this case, the second and third nearest neighbors will likely be in the same module, so setting j to 2 and k to 3 has proved satisfactory. However, there is nothing to limit looking to the three nearest neighbors; one could also examine a larger neighborhood.

Since a maverick list can potentially be quite large, Arch prioritizes each maverick by its confidence, and presents them worst first.

The actual maverick analysis method is straightforward: Maverick Analysis

This is a method for identifying software objects that have been assigned to the wrong group. Specifically, it checks each object to see whether it belongs to its current group with K peers and confidence N, and whether it belongs to another group with a lower confidence rating. It assumes that the similarity between two software objects is known, typically by evaluating a similarity function.

1. Input: a set of software objects, assigned to various groups, peer parameter K, and confidence parameter N.

2. Determine the similarity between each pair of objects, such as by computing a similarity function such as Feature Ratio With Linking.

3. For each object O, 3.a. Sort O's neighbors, nearest first.

3.b. Examine O's neighbors in order, counting how many of them are assigned to one or another group, until K are found that are assigned to the same group. Record the group name, say G, and the number of neighbors examined, say E.

3.c. If G is the group to which O is currently assigned, mark O as being correctly classified with confidence and skip to step [4.]

3.d. Otherwise, continue examining the neighbors in order until K have been found that are assigned to the same module as O, or until all neighbors have been examined. Record the number of neighbors examined, say F. Mark O as being misclassified, with confidence , and as likely belonging to group G with confidence .

4. Sort the misclassified objects according to their mis-classification confidence, greatest first, and output the list, reporting for each object the current group assignment, the mis-classification confidence, the group that the object likely belong to, and the confidence with which it likely belongs.

5. Sort the objects that are correctly classified but with confidence greater than N (here "greater" corresponds to "worse"), sorting by confidence, greatest first, and output the sorted list, reporting for each object the confidence with which it belongs to the module to which it is currently assigned.

Arch has been used to critique the modularity of five software systems. These informal experiments have taken place over an 18-month period, and so each used Arch at a somewhat different level of ability. However, together they show that Arch gives valuable advice in real maintenance situations. The experiments only analyzed similarity between procedures, and did not consider that other kinds of software objects might be mavericks.

The systems were all written in C, ranging in size from 64-1100 procedures, spanning 7-75 modules. Types of systems studied included experimental code, rapid prototype, carefully crafted product, and old, heavily abused code. Some of the code was still undergoing maintenance, while other code was abandoned. In every case it was possible to consult code experts to assess the value of Arch's analysis.

5.2. Maverick Experiments

Experiments on four systems, without tuning, flagged 10-30% of the procedures as mavericks. Of these, 20-50% were symptoms of real modularization errors in the code. Types of errors encountered included:

A module that had been split into two without regard to information hiding.

Modules that were "temporarily" split during development, and never put back together.

Procedures that combined two very different kinds of functionality, each belonging to a different module. (These procedures were all written by the same rogue programmer!)

An "unformed module": functionality scattered throughout the system that should have been collected into a single, new module.

Pairs of procedures, in different modules, that performed exactly the same function on slightly different data structures.

Programming bugs such as using the wrong global variable, or omitting a required procedure call.

Code fragments that had been copied many times rather than making a procedure or macro out of them.

A data abstraction that was violated by outside procedures accessing record fields directly.

An incomplete data abstraction, missing some the access procedures needed to hide its implementation.

Mistakes left over from a previous reorganization.

Three small, closely related modules that should have been merged.

Unused procedures.

The automatic tuning method is based on the expectation that a procedure will be more similar to other procedures in the same module than to procedures in different modules. For each procedure in the system, it identifies the five (more generally, k nearest good neighbors, and compares each of them to each of the procedure's bad neighbors. Its goal is to minimize the frequency with which a bad neighbor is more similar to a subject procedure than one of the subject's five nearest good neighbors. It achieves this goal by repeatedly examining each of the possible combinations of a subject, a good neighbor, and a bad neighbor, and adjusting the weights (by gradient descent) to bring the good neighbor closer and push the bad neighbor farther away. The inputs and outputs of the algorithm are reiterated as follows:

TVERSKY NET TUNING METHOD: INPUTS AND OUTPUTS

Inputs

A similarity function with adjustable coefficients

An optional initial set of values for the coefficients. If no values are given, the method supplies randomized initial values.

A list of which coefficients should be adjusted.

A set of objects whose similarity can be measured by the function.

A set of categories, such that each object is assigned to exactly one category.

A neighborhood size, K. Result:

A set of values for the coefficients that maximize the frequency with which an object and one of its K nearest neighbors are in the same category.

The following problem was used as an experiment. A modest-sized problem was used for early experiments. The code is real: it is an early version of Arch's batch clustering tool. It comprises 64 procedures, grouped into seven modules Membership in the modules is distributed as follows:

module
12 outputmgt
14 simwgts
10 attr
12 hac
7 node
4 objects
5 massage

The sample problem has two parts:

1. Identify classification errors in the given data, and remove the offending procedures for reclassification later.

2. Learn a similarity measure, by training on the remaining procedures, that can be used to classify the procedures by the nearest-neighbor rule.

The software is written in C. Extracting cross-references produced 152 distinct feature names. However, many of these features occurred in only one procedure each, and were therefore greatly increasing the size of the problem without ever contributing to the similarity of two procedures. Therefore, all such singly-occurring features are eliminated, leaving 95.

The code was expected to contain modularization errors, being a rapid prototype. However, it was desirable to create a "clean" data set for test purposes. Therefore, by a combination of logical and heuristic methods several possible errors were identified and examined. However, a procedure was not removed from the data set unless it appeared that it was both a true modularization error and an object that the present method would not be able to adapt to. Twelve procedures were thus removed, leaving 52.

When trained on the remaining 52 procedures, the gradient descent algorithm successfully found weights for which every procedure was in the same module as its nearest neighbor. Therefore, it may be said that Arch "learned" a similarity measure that was adequate to explain the module membership of every procedure in the training data. The computation took about 10 minutes on a Sun Microsystems SPARCstation 1+.

Generalization Performance: learning performance, by itself, is not the primary goal. Instead, the objective is to use the tuned similarity measure to check the module assignment of procedures that were not in the training data.

To test the network's generalization, a jackknife test was constructed, in which the 52 procedures were divided into a training set and a test set, to determine how well the tuned similarity measure would predict the module membership of procedures that were not in the training data. The test consisted of 13 experiments, each using 48 procedures for training and 4 for testing, such that each procedure was used for testing exactly once. Each procedure was tested by using the similarity function to identify its nearest neighbor, and predicting that the tested procedure belonged to that neighbor's module.

The results of the jackknife test are shown in the table below. Each row gives the number of procedures that were in that module, and how many of them were classified into each module during the jacknife test.

| actual | | predicted module | | | | | |
|---|---|---|---|---|---|---|---|
| | | A | B | C | D | E | F |
| A | 11 | 11 | | | | | |
| B | 11 | | 10 | 1 | | | |
| C | 9 | | | 9 | | | |
| D | 8 | | | | 8 | | |
| E | 7 | | | | | 7 | |
| F | 2 | | | | | | 2 |

Out of the 52 procedures in the data set, only one was misclassified.

Incremental Adaptation To The Architect: next, a way is needed to incorporate the automatic tuning method into the maverick analysis and clustering services. The difficulty lies in fitting the data too well. If Arch tunes the measure to precisely fit an existing system, the services will not suggest any changes!

Arch will overcome this problem by using only qualified data to tune the similarity function.

Given a set of groups of software objects, a peer parameter K and a confidence parameter N, it provides initial estimates for the weights and coefficients of the similarity function, uses them to identify an initial maverick list, removes the mavericks from their assigned groups, and then passes the modified groups to the neural network for tuning. The complete process is this:

1. Input: a set of software objects, each assigned to one of a set of groups, peer parameter K and confidence parameter N.
2. Compute initial weights for each feature using Shannon information content.
3. Create the Unexplainable Set, initially empty.
4. Create the Firmly Assigned Set, initially empty.
5. Pass the similarity function and the initial weights for the features to the Tversky Net Method, along with the objects, their group assignments, and neighborhood parameter. Specify that only the coefficients k, n, and d should be varied, and not the weights of individual features.
6. Receive from the Tversky Net updated values for the coefficients.
7. Use the updated coefficients, with the Maverick Analysis method (using K and N) to obtain lists of misclassified and poor-confidence mavericks. Place these mavericks in the Current Maverick Set, replacing its previous contents, if any.
8. Present the Current Maverick Set to the analyst, highlighting any current maverick that is also in the Firmly Assigned Set.
9. Receive input that resolves one maverick. The input can indicate one of the following:
9.a. The maverick should be deferred. It is removed from the Current Maverick Set and/or the Firmly Assigned Set and placed in the Deferred Maverick Set.
9.b. The maverick is firmly assigned to a certain group. It is removed from the Current Maverick Set and/or the Deferred Maverick Set, and, placed in the Firmly Assigned Set, and its group assignment is updated to be the group named in the input.
9.c. Certain objects should have certain features added to them or removed from them. These changes are performed.
9.d. The similarity measure should be returned. In this case, the Tversky Net is used again. This time, its inputs are: a subset of the original set of software objects, consisting of the original set less the members of the Deferred Maverick Set and the Current Maverick Set, plus the members of the Firmly Assigned Set; the weights and coefficients used in the last maverick analysis; modified group assignments as specified in step [8.b.]; and, specification that all weights and coefficients should be varied if need be. Go back to step [6.]
9.e. Maverick resolution is complete. The incremental adaptation process stops.

The net effect of this incremental learning process will be that Arch starts with a naive view of similarity based on the information hiding principle and Shannon information content, then gradually modifies this view to fit the architect's judgements, bending "just enough" to agree with the architect. The architect will not have to manually approve the objects that the tool already agrees are classified correctly; she only needs to examine those that seem to be mavericks. Whenever she rejects a maverick, Arch revises its own maverick criteria, by tuning weights, and removes from the list any objects that are no longer mavericks by the revised criteria.

Thus Arch's similarity measure is a useful model for the way that programmers judge similarity between objects during modularization, and that the advisory services are promising tools for re-engineering software modularity.

What is claimed is:

1. A method for use in a programmable computer system for identifying software objects that have been assigned to a wrong group, said group being intended to represent a respective cluster of internally similar software objects, wherein the similarity between objects is determined, such as by evaluating a similarity function, and wherein the input comprises a set of software objects, assigned to various groups, peer parameter K, and confidence parameter N, said method comprising the computer-implemented steps of:
   (a) ascertaining the similarity between each pair of objects, such as by computing a similarity function such as Feature Ratio With Linking;
   (b) for each object O,
       (b.1) sorting O's neighbors, nearest first,
       (b.2) examining O's neighbors in order, counting how many of them are assigned to one or another group, until K are found that are assigned to the same group, recording the group name, say G, and the number of neighbors examined, say E,
       (b.3) if G is the group to which O is currently assigned, marking O as being correctly classified with confidence E-K and skipping to step (c), and
       (b.4) otherwise, continuing examining the neighbors in order until K have been found that are assigned to the same module as O, or until all neighbors have been examined, recording the number of neighbors examined, say F, marking O as being misclassified, with confidence F-K, and as likely belonging to group G with confidence E-K;
   (c) sorting the misclassified objects according to their mis-classification confidence, greatest first (here "greater" corresponds to "worse"), and outputting the list, reporting for each object the current group assignment, the mis-classification confidence, the group that the object likely belong to, and the confidence with which it likely belongs; and
   (d) sorting the objects that are correctly classified but with confidence greater than N (here "greater" corresponds to "worse"), sorting by confidence, greatest first, and outputting the sorted list, reporting for each object the confidence with which it belongs to the module to which it is currently assigned, whereby the likelihood of misclassification of objects is ascertainable by the respective confidence level.

2. A method for use in a programmable computer system for identifying software objects that have been assigned to a wrong group by sorting the misclassified objects according to their confidence ratings, wherein the similarity between objects is determined, such as by evaluating a similarity function, and wherein the input comprises a set of software objects, assigned to various groups, peer parameter K, and confidence parameter N, said method comprising the computer-implemented steps of:
   (a) ascertaining the similarity between each pair of objects, such as by computing a similarity function such as Feature Ratio With Linking;
   (b) for each object O,
       (b.1) sorting O's neighbors, nearest first,
       (b.2) examining O's neighbors in order, counting how many of them are assigned to one or another group, until K are found that are assigned to the same group, recording the group name, say G, and the number of neighbors examined, say E,
       (b.3) if G is the group to which O is currently assigned, marking O as being correctly classified with confidence and skipping to step (c), and
       (b.4) otherwise, continuing examining the neighbors in order until K have been found that are assigned to the same module as O, or until all neighbors have been examined, recording the number of neighbors examined, say F, marking O as being misclassified, with confidence F-K, and as likely belonging to group G with confidence E-K; and
   (c) sorting the misclassified objects according to their confidence ratings.

3. A method for use in a programmable computer system for identifying misclassified software objects that have been assigned to a wrong group and sorting misclassified objects according to an object's similarity to its nearest bad neighbor, wherein the similarity between objects is determined, such as by evaluating a similarity function, and wherein the input comprises a set of software objects, assigned to various groups, peer parameter K, and confidence parameter N, said method comprising the computer-implemented steps of:
   (a) ascertaining the similarity between each pair of objects, such as by computing a similarity function such as Feature Ratio With Linking;
   (b) for each object O,
       (b.1) sorting O's neighbors, nearest first,
       (b.2) examining O's neighbors in order, counting how many of them are assigned to one or another group, until K are found that are assigned to the same group, recording the group name, say G, and the number of neighbors examined, say E,
       (b.3) if G is the group to which O is currently assigned, marking O as being correctly classified with confidence E-K and skipping to step (c), and
       (b.4) otherwise, continuing examining the neighbors in order until K have been found that are assigned to the same module as O, or until all neighbors have been examined, recording the number of neighbors examined, say F, marking O as being misclassified, with confidence F-K, and as likely belonging to group G with confidence E-K; and
   (c) sorting the misclassified objects by assigning a priority to a misclassified object according to its similarity to its nearest bad neighbor and an output list is sorted by priority.

4. A method for identifying software objects in accordance with claim 1, wherein the similarity between objects is determined by using feature ratio with linking.

5. A method for use in a programmable computer system for identifying software objects that have been assigned to a wrong group by outputting a sorted list reporting for each object the confidence with which it belongs to a module to which it is currently assigned, and wherein the input comprises a set of software objects, assigned to various groups, peer parameter K, and confidence parameter N, said software objects comprising the static declaration units of a program and having non-local identifiers that designate them, a coefficient k controlling how important the invoker-invokee relationship is in computing similarity, relative to the importance of having common features, a coefficient d controlling how sensitive the measure is to distinctive features, a coefficient n controlling how sensitive similarity is to the total weight of the common features, said method comprising the computer-implemented steps of:

(a) determining the similarity between each pair of objects, whereof typical first and second software objects, hereinafter referred to as "A" and "B", being declared to be within said system, coefficients for the similarity function being in this case designated "k", "n", and "d"; and bias multipliers being designated for predetermined features, each of said bias multiplier comprising a feature name and a positive number;

(b) applying a conventional cross-reference extractor to identify all of the software objects declared in said system, to generate a unique name for each non-local identifier, and to locate each occurence of a non-local identifier;

(c) for each occurrence of a non-local identifier, determining the unique name of the identifier, herein referred to as "Y", and the unique name of the object wherein it occurs, herein designated "X" and assigning to "X" the feature "uses-Y", and assigning to "Y", if it is a software object, the feature "used-by-X" and if one of X and Y already had the feature just assigned to it, not duplicating these feature assignments;

(d) to each feature named in step (c), herein designated "f", assigning a weight Wf= −log (probability (f));

(d) for each bias multiplier specified in the input, recomputing the weight of that feature by multiplying its Shannon information content by the specified multiplier;

(f) comparing the features of objects A and B, and dividing them into three sets, a first set being A∩B the features that both A and B have, a second set being the features that A−B has and B does not, and a third set being the features that B has and A does not B−A;

(g) computing the sums of the weights of the features in each of said three sets, denote these, (F(A∩B), F(A−B), and F(B−A), respectively;

(h) computing the similarity of A and B by a monotonic, matching function, which must also satisfy the constraint that if the set is empty, and neither object uses the name of the other object, the similarity is 0;

(i) determining the similarity between each pair of objects, such as by computing a similarity function such as Feature Ratio With Linking;

(j) for each object O,
  (j.1) sorting O's neighbors, nearest first,
  (j.2) examining O's neighbors in order, counting how many of them are assigned to one or another group, until K are found that are assigned to the same group, recording the group name, say G, and the number of neighbors examined, say E,
  (j.3) if G is the group to which O is currently assigned, marking O as being correctly classified with confidence E-K and skipping to step (k), and
  (j.4) otherwise, continuing examining the neighbors in order until K have been found that are assigned to the same module as O, or until all neighbors have been examined, recording the number of neighbors examined, say F, marking O as being misclassified, with confidence, and as likely belonging to group G with confidence;

(k) sorting the misclassified objects according to their mis-classification confidence, greatest first, and outputting the list, reporting for each object the current group assignment, the mis-classification confidence, the group that the object likely belong to, and the confidence with which it likely belongs;

(l) sorting the objects that are correctly classified but with confidence greater than N (here "greater" corresponds to "worse"), sorting by confidence, greatest first, and outputting the sorted list, reporting for each object the confidence with which it belongs to the module to which it is currently assigned.

* * * * *